United States Patent
Ma et al.

(10) Patent No.: US 12,424,665 B2
(45) Date of Patent: Sep. 23, 2025

(54) POROUS CERAMIC SEPARATOR MATERIALS AND FORMATION PROCESSES

(71) Applicant: Apple Inc., Cupertino, CA (US)

(72) Inventors: Lin Ma, Santa Clara, CA (US); Mikyong Yoo, Palo Alto, CA (US); Richard M. Mank, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 433 days.

(21) Appl. No.: 17/940,880

(22) Filed: Sep. 8, 2022

(65) Prior Publication Data

US 2023/0006241 A1    Jan. 5, 2023

Related U.S. Application Data

(62) Division of application No. 16/031,316, filed on Jul. 10, 2018, now Pat. No. 11,870,037.
(Continued)

(51) Int. Cl.
*C04B 35/626* (2006.01)
*C04B 35/10* (2006.01)
(Continued)

(52) U.S. Cl.
CPC .......... *H01M 10/058* (2013.01); *C04B 35/10* (2013.01); *C04B 35/6264* (2013.01);
(Continued)

(58) Field of Classification Search
CPC .... H01M 10/058; H01M 4/583; H01M 4/661; H01M 50/4295; H01M 50/434;
(Continued)

(56) References Cited

U.S. PATENT DOCUMENTS 5,922,492 A   7/1999  Takita et al.
6,148,503 A   11/2000 Delnick et al.
(Continued)

FOREIGN PATENT DOCUMENTS

CN   102244220 A   11/2011
CN   102884665 A   1/2013
(Continued)

OTHER PUBLICATIONS

"Notice of Allowance," mailed Aug. 30, 2023 in U.S. Appl. No. 16/031,316. 7 pages (no copy attached).
(Continued)

*Primary Examiner* — Christian Roldan
(74) *Attorney, Agent, or Firm* — Kilpatrick Townsend & Stockton LLP

(57) ABSTRACT

Energy storage devices, battery cells, and batteries may include a battery cell component that may be or include a ceramic layer produced by methods including admixing a ceramic with a water-soluble dispersant to form a first mixture. The methods may include admixing an organic polymeric dispersant with the first mixture to form a second mixture. The methods may include admixing a binder with the second mixture to form a slurry. The methods may also include depositing the slurry on a substrate.

20 Claims, 5 Drawing Sheets

Related U.S. Application Data

(60) Provisional application No. 62/655,603, filed on Apr. 10, 2018.

(51) Int. Cl.
| | | |
|---|---|---|
| *C04B 35/636* | (2006.01) | |
| *H01M 4/02* | (2006.01) | |
| *H01M 4/583* | (2010.01) | |
| *H01M 4/66* | (2006.01) | |
| *H01M 10/058* | (2010.01) | |
| *H01M 50/429* | (2021.01) | |
| *H01M 50/434* | (2021.01) | |
| *H01M 50/44* | (2021.01) | |
| *H01M 50/489* | (2021.01) | |
| *H01M 50/403* | (2021.01) | |
| *H01M 50/491* | (2021.01) | |

(52) U.S. Cl.
CPC ......... *C04B 35/6365* (2013.01); *H01M 4/583* (2013.01); *H01M 4/661* (2013.01); *H01M 50/4295* (2021.01); *H01M 50/434* (2021.01); *H01M 50/44* (2021.01); *H01M 50/489* (2021.01); *H01M 2004/027* (2013.01); *H01M 2004/028* (2013.01); *H01M 50/403* (2021.01); *H01M 50/491* (2021.01)

(58) Field of Classification Search
CPC .. H01M 50/44; H01M 50/489; H01M 50/403; H01M 50/491; H01M 2004/027; H01M 2004/028; H01M 10/0525; H01M 50/446; C04B 35/10; C04B 35/6264; C04B 35/6365; C04B 35/111; C04B 2235/322; C04B 2235/5409; Y02E 60/10; Y02P 70/50
USPC .......................................................... 429/129
See application file for complete search history.

(56) References Cited

U.S. PATENT DOCUMENTS

| | | | | |
|---|---|---|---|---|
| 6,150,056 | A * | 11/2000 | Inagaki ................. | H01M 4/806 429/240 |
| 12,080,843 | B2 | 9/2024 | Yoo et al. | |
| 2007/0122715 | A1 | 5/2007 | Fujino et al. | |
| 2008/0241674 | A1 | 10/2008 | Kim | |
| 2008/0286635 | A1 * | 11/2008 | Seino ....................... | B32B 7/12 428/354 |
| 2008/0299461 | A1 | 12/2008 | Kim | |
| 2010/0216000 | A1 | 8/2010 | Fujita et al. | |
| 2010/0221607 | A1 | 9/2010 | Hatanaka et al. | |
| 2011/0045168 | A1 | 2/2011 | Seo et al. | |
| 2011/0135987 | A1 | 6/2011 | Shin | |
| 2011/0217585 | A1 | 9/2011 | Wang et al. | |
| 2012/0021264 | A1 | 1/2012 | Morishima | |
| 2012/0225345 | A1 | 9/2012 | Kim | |
| 2012/0308887 | A1 | 12/2012 | Hucker et al. | |
| 2013/0216867 | A1 | 8/2013 | Schaefer et al. | |
| 2013/0260207 | A1 | 10/2013 | Uemura | |
| 2014/0045056 | A1 | 2/2014 | Yamami et al. | |
| 2014/0162139 | A1 | 6/2014 | Hoshiba et al. | |
| 2014/0242444 | A1 * | 8/2014 | Nishikawa ............ | H01M 50/26 429/144 |
| 2014/0248525 | A1 | 9/2014 | Iwai et al. | |
| 2015/0147624 | A1 | 5/2015 | Yamafuku et al. | |
| 2015/0243952 | A1 | 8/2015 | Ka et al. | |
| 2015/0263325 | A1 * | 9/2015 | Honda ................. | H01M 50/451 429/144 |
| 2015/0357619 | A1 | 12/2015 | Bae et al. | |
| 2016/0043370 | A1 | 2/2016 | Hatta et al. | |
| 2016/0149184 | A1 | 5/2016 | Nam et al. | |
| 2016/0164060 | A1 * | 6/2016 | Zhang ................. | H01M 50/403 429/144 |
| 2016/0233475 | A1 * | 8/2016 | Son ...................... | H01M 50/414 |
| 2017/0033350 | A1 | 2/2017 | Mizuno et al. | |
| 2017/0263907 | A1 | 9/2017 | Ameyama et al. | |
| 2017/0317375 | A1 | 11/2017 | Cho | |
| 2018/0309108 | A1 | 10/2018 | Shin et al. | |
| 2019/0148692 | A1 | 5/2019 | Yoo et al. | |
| 2019/0207190 | A1 * | 7/2019 | Hu .......................... | B32B 9/005 |
| 2019/0245182 | A1 | 8/2019 | Liao et al. | |

FOREIGN PATENT DOCUMENTS

| | | | |
|---|---|---|---|
| CN | 105849942 | A | 8/2016 |
| CN | 106410266 | A | 2/2017 |
| CN | 107342391 | A | 11/2017 |
| JP | 2011243351 | A | 12/2011 |
| JP | 5579497 | B2 | 8/2014 |
| KR | 20080088194 | A | 10/2008 |
| KR | 20160118966 | A | 10/2016 |
| KR | 20170012962 | A | 2/2017 |
| KR | 20170014223 | A | 2/2017 |
| WO | 2005124918 | A2 | 12/2005 |
| WO | 2017171524 | A1 | 10/2017 |

OTHER PUBLICATIONS

"Aluminum Oxide", Al2O3, PubChem, Available Online at: https://pubchem.ncbi.nlm.nih.gov/compound/Aluminum-oxide, 2021, 37 pages.
U.S. Appl. No. 15/907,762, Final Office Action, Mailed on May 21, 2021, 25 pages.
U.S. Appl. No. 15/907,762, Non-Final Office Action, Mailed on Jan. 14, 2021, 18 pages.
U.S. Appl. No. 16/031,316, Final Office Action, Mailed on Jan. 26, 2021, 18 pages.
U.S. Appl. No. 16/031,316, Non-Final Office Action, Mailed on Dec. 21, 2021, 18 pages.
U.S. Appl. No. 16/031,316, Non-Final Office Action, Mailed on Apr. 17, 2020, 9 pages.
Chinese Patent Application No. 201811361537.5, Notice of Decision to Grant, Mailed on Mar. 3, 2022, 7 pages.
Chinese Patent Application No. 201811361537.5, Office Action, Mailed on Apr. 23, 2021, 17 pages.
"Non-Final Office Action," mailed Mar. 7, 2023 in U.S. Appl. No. 16/031,316). 18 pages (no copy attached).
"Final Office Action," mailed Oct. 17, 2022 in U.S. Appl. No. 16/031,316. 17 pages (no copy attached).
U.S. Appl. No. 17/940,885, Non-Final Office Action, Mailed on Jan. 31, 2025, 12 pages.

* cited by examiner

POROUS CERAMIC SEPARATOR MATERIALS AND FORMATION PROCESSES

CROSS-REFERENCE TO RELATED APPLICATIONS

This application is a divisional of U.S. patent application Ser. No. 16/031,316 filed Jul. 10, 2018, which claims priority to U.S. Provisional Application No. 62/655,603, filed Apr. 10, 2018. These applications are incorporated by reference herein in their entirety.

TECHNICAL FIELD

The present technology relates to batteries and battery components. More specifically, the present technology relates to improved battery separator designs and configurations for energy storage devices.

BACKGROUND

In rechargeable battery designs, the separator allows ionic transmission for charging and discharging, while preventing electrical contact between the electrode materials. As battery designs utilize different materials, and continue to increase in volumetric density, the separator may be stressed further during cycling.

SUMMARY

Energy storage devices, battery cells, and batteries may include a battery cell component that may be or include a ceramic layer produced by methods including admixing a ceramic with a water-soluble dispersant to form a first mixture. The methods may include admixing an organic polymeric dispersant with the first mixture to form a second mixture. The methods may include admixing a binder with the second mixture to form a slurry. The methods may also include depositing the slurry on a substrate.

In some embodiments, the water-soluble dispersant may be an ionic dispersant. The ionic dispersant may be characterized by a polymeric chain having a cationic component within a repeated moiety of the polymeric chain. The organic polymeric dispersant may be or include carboxymethyl cellulose. Admixing the binder may also include incorporating isopropyl alcohol within the second mixture. The slurry may be characterized by a viscosity below about 200 cp. The substrate may be a carrier film, an electrode, or a polymer layer. The slurry may be deposited on the substrate to a thickness of less than or about 10 μm. The ceramic material comprises gamma alumina. The methods may also include depositing an adhesive material on a surface of the ceramic material. The adhesive material may be an acrylate or polyvinylidene fluoride ("PVDF").

The present technology may also encompass methods for producing a battery cell component. The methods may include forming a slurry comprising a ceramic material, a binder, and an ionic dispersant. The ceramic material may be greater than 50% of the slurry by weight. The methods may also include applying the slurry to a polymeric material to form a two layer separator. The slurry may be applied to a thickness of less than or about 10 μm. The methods may also include depositing an adhesive material over the applied slurry of ceramic material. The slurry may be characterized by a viscosity below about 200 cp. The ceramic material may be selected from materials include aluminum oxide, magnesium oxide, zinc oxide, zirconium oxide, silicon oxide, titanium oxide, copper oxide, tin oxide, or chromium oxide. In some embodiments the ceramic material may be characterized by an HF gas absorption rate of at least about 2 mg HF/g of the ceramic material.

The present technology may also encompass battery cells. The battery cells may include a first current collector and a cathode active material disposed along the first current collector. The battery cells may include a second current collector and an anode active material disposed along the second current collector. The battery cells may also include a separator disposed between the cathode active material and the anode active material. The separator may be or include a ceramic material layer characterized by a thickness less than about 10 μm. The ceramic material layer may include ceramic particles characterized by a specific surface area of at least about 100 m2/g. The ceramic materials of the ceramic material layer may be selected from the group including aluminum oxide, magnesium oxide, zinc oxide, zirconium oxide, silicon oxide, titanium oxide, copper oxide, tin oxide, or chromium oxide. The ceramic materials may be characterized by an HF gas absorption rate of at least about 2 mg HF/g of the ceramic material. The battery cells may also include an adhesive material disposed across a surface of the separator.

The present technology may provide numerous benefits over conventional technology. For example, the present separators may have improved mechanical integrity at reduced profile thicknesses over conventional designs. Additionally, the described methods may produce more uniform ceramic material layers, allowing reduced formation thicknesses. These and other embodiments, along with many of their advantages and features, are described in more detail in conjunction with the below description and accompanying figures.

BRIEF DESCRIPTION OF THE DRAWINGS

A further understanding of the nature and advantages of the disclosed embodiments may be realized by reference to the remaining portions of the specification and the drawings.

Figure 1:
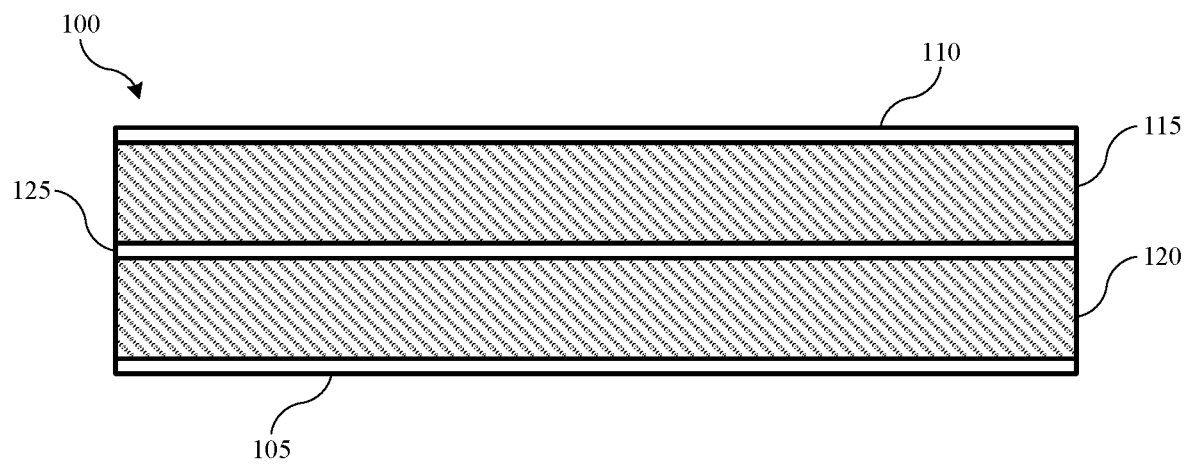
FIG. 1 shows a schematic view of layers of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Battery separators provide a variety of functions within a battery cell. In addition to supporting ionic transport between a cathode and anode, the material limits electrical contact of the two components to prevent electrical shorting between cathode and anode materials. Battery separators may be formulated by balancing a number of characteristics of the component. For example, battery separators may include materials selected based on compatibility with electrode materials or electrolyte materials, electrochemical stability, thermal stability, flexibility, and other factors. Battery separators can include combinations of components as well. For example, woven polymeric separators are sometimes utilized in battery designs because of the porosity provided. An issue with woven polymeric separators, however, is that they may be less thermally stable, and may shrink during operation or during abuse conditions, which may lead to shorting. More thermally stable designs may include non-woven polymers and/or ceramic separators. However, these designs may lose mechanical flexibility and have reduced permeability, and may require increased thicknesses due to manufacturing limitations. For example, ceramic separators having a thickness less than a few dozen micrometers may exhibit a brittle structure reducing handling capability. Ceramic separators may also lack a shutdown capability allowing the separator to limit or reduce ionic transfer between electrodes during abuse conditions.

Conventional technologies have been limited to utilizing ceramic separators with technologies that allow for increased thickness. For example, many conventional mobile devices may not include ceramic separators due to constraints on the thickness of a separator, which may be half the thickness needed for ceramic stand-alone separators. As many electrode assembly operations utilize roll-to-roll or winding processes, ceramic separators may be incapable of winding unless maintained above a few dozen micrometers in thickness. Additionally, the dense ceramic structure may be characterized by reduced air permeability and lower ionic transport rates, which may affect operation of the produced batteries. Ceramic separators may also be characterized by limited adhesion with the electrode active material. Without sufficient adhesion, the active material may swell during operation or produce dendrites affecting cycle life of the produced battery.

The present technology may overcome these issues by forming separators including multiple layers including a first layer having a ceramic material, and a second layer including an adhesive. The layers may be formed directly over additional cell materials, which may act as a support for the ceramic material. This may produce battery cell components that may be wound, while being characterized by reduced thicknesses over conventional materials. Separators according to some embodiments of the present technology may also include additional features including porogens or microencapsulated materials providing additional improvements over conventional materials. Accordingly, the present technology provides separators characterized by improved thermal stability and other operational characteristics compared to conventional designs.

The present technology additionally addresses issues related to formation of ceramic materials. As surface area increases with ceramic materials, manufacturing may become more difficult as issues related to aggregation of particulate matter may increase. By utilizing materials that may include particular characteristics, and/or by producing the ceramic materials in controlled manufacturing processes, the present technology may produce improved ceramic materials. The materials may be characterized by slurries having improved uniformity, viscosity, and deposition characteristics, which may allow ceramic materials of reduced thickness to be produced. These ceramic materials may be used as standalone separators, or may be used in combination separators of reduced thickness. These improved manufacturing processes may also be applicable in a variety of other industries that may use or include thin film ceramic materials, as well as in general manufacturing of ceramic materials where the present techniques may be useful.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Aspects of the present technology may further be utilized in additional industries in which ceramic materials may be used. Accordingly, the disclosure and claims are not to be considered limited to any particular example discussed, but can be utilized broadly with any number of devices that may exhibit some or all of the electrical or chemical characteristics of the discussed examples.

FIG. 1 shows a cross-sectional view of an exemplary energy storage device 100 according to some embodiments of the present technology. Energy storage device 100 may be a battery, a battery cell, or some other energy storage device in embodiments. Exemplary energy storage device 100 includes a first current collector 105 and a second current collector 110, one of which may be the anode, and the other the cathode side of the energy storage device. Current collectors 105 and 110 may be made of any known collector materials, such as aluminum, copper, nickel, stainless steel, or a variety of other materials that may be capable of operating at cathode and anode potentials within the cell environment.

Energy storage device 100 includes electrode active material 115 disposed on current collector 110, and electrode active material 120 disposed on current collector 105. Again, either of electrode active materials 115, 120 may be the anode or cathode materials in exemplary designs. In some examples, electrode active material 115 is an anode material and includes a carbon-containing compound such as graphite or a lithium-containing compound such as lithium titanate. Any other anode materials may similarly be used with the present technology. Additionally, for example, electrode active material 120 is a cathode material including a lithium-containing material such as lithium cobalt oxide or lithium phosphate, among other known lithium compounds used in such devices. The electrode active material 120 may also include nickel, manganese, cobalt, aluminum, and a variety of other materials that would be understood to be encompassed by the present technology. Indeed, any possible anode and cathode materials that may be utilized in batteries including separators as will be described below are suitable for the present designs, and will be understood to be encompassed by the present technology. Separator 125 is disposed between the electrode active materials 115, 120, and may include a variety of materials that allows lithium ions to pass through the separator structure while not otherwise conducting electricity.

Figure 2:
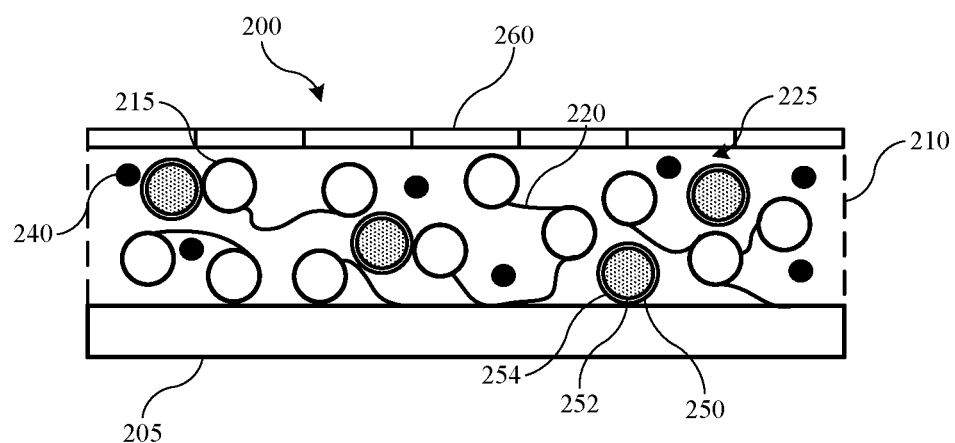
FIG. 2 shows a schematic view of an exemplary separator according to some embodiments of the present technology.

FIG. 2 shows a schematic view of an exemplary separator 200 according to embodiments of the present technology. Separator 200 may be included in a battery cell, such as battery cell 100 previously described. The separator may be positioned between active materials for an anode and a cathode in embodiments, and may be formed directly over an electrode active material 205. In some embodiments an additional layer, such as a polymer layer may be disposed between the electrode active material 205 and the separator. Exemplary separator 200 is characterized by a first separator layer 210, and a second separator layer 260.

First separator layer 210 includes one or more materials including a ceramic material in some embodiments. Incorporating a ceramic material into the separator structure may afford dimensional stability as well as reduced thermal shrinkage. When incorporated as a particulate material, ceramics may include a platelet structure, which may increase tortuosity through the separator structure, or reduce porosity. Both pore size and pore structure relate to the ease with which ions, such as lithium ions, for example, may pass through the separator structure. The more tortuous the path through the structure, the more cycling rate capability may be reduced. Accordingly, first separator layer 210 is not completely composed of ceramic materials in some embodiments, or may include additional materials that allow porosity to be adjusted within the first separator layer 210.

In some embodiments, a binder is included in the first separator layer with the ceramic materials, which provides a structure that maintains particular ion throughput characteristics for the separator. As illustrated within an unspecified spacing 225, binder material 220 may form polymer chains among ceramic particles 215. The ceramic particles 215 and the binder 220 are the materials composing the first separator layer in some embodiments, while in some embodiments additional materials may also be included in the first separator layer 210. When the ceramic particles and binder substantially make up the first separator layer, the ceramic particles may be included at greater than or about 40 wt. % of the first separator layer, and in embodiments the ceramic particles may be included at greater than or about 50 wt. %, greater than or about 60 wt. %, greater than or about 70 wt. %, greater than or about 80 wt. %, greater than or about 90 wt. %, greater than or about 95 wt. %, or more of the first separator layer, with the balance being the binder material and/or additional components of the first separator layer when included.

For example, in embodiments the binder is included at less than or about 60 wt. % of the first separator layer. In some embodiments, the binder may be included at less than or about 50 wt. %, less than or about 40 wt. %, less than or about 30 wt. %, less than or about 20 wt. %, less than or about 10 wt. %, less than or about 5 wt. %, or less of the first separator layer, with the balance being the ceramic particles, and/or any additional components that may be included in the first separator layer.

Binders utilized with the present technology may be characterized by a glass transition temperature above operational temperatures of the battery cell. By utilizing binders having a higher glass transition temperature, separators according to the present technology are characterized by improved thermal and dimensional stability in embodiments, and are less prone to shrinking over cell lifetime or during abuse conditions, or may shrink to a lesser degree than separators including binders characterized by a lower glass transition temperature. In some embodiments, one or more including all binders utilized in the first separator layer may be characterized by a glass transition temperature greater than or about 100° C.

Combinations of materials, amounts of materials, and characteristics of the materials themselves may produce binders characterized by a glass transition temperature of any temperature within any particular range over 100° C., or within smaller ranges, such as between about 190° C. and about 300° C. or less, in some embodiments. By utilizing binders characterized by higher glass transition temperatures, produced first separator layers may be characterized by reduced flexibility or ductility compared to layers produced with other binders. However, the amount and types of binders may be modified, functionalized, or adjusted to limit cracking or other issues related to malleability, while still maintaining the desired thermal and dimensional stability characteristics.

A variety of materials may be used as binders according to the present technology. Binders may include any polymeric materials that may be characterized by any of the previously noted glass transition temperatures, compatibility with the ceramic particles, or chemical or electrochemical stability with electrolyte materials that may be used within battery cells. Exemplary materials that may be used or included with binders of the present technology may include polyimides. The polyimides may be linear or include aromatic moieties, and may include semi-aromatic polyimides. Exemplary polyimides may also be modified to incorporate additional functional moieties including carboxylate moieties, for example. The binder materials may also include polyamides, which may also be aliphatic, semi-aromatic, or otherwise include aromatic moieties such as aramids. Exemplary materials may include amorphous polymers, such as polyamide imides, for example, or other polymeric materials that are characterized by glass transition temperatures as discussed above, and exhibit other properties suitable for battery cells according to the present technology.

Ceramic materials that may be incorporated with the binders for the first separator layer 210 may include any ceramic that may afford additional dimensional stability to the separator design. The ceramic materials may include oxides, nitrides, carbides, hydroxides, and titanates of a number of materials. Exemplary elements for these compounds may be or include barium, copper, tin, strontium, boron, iron, lead, zirconium, chromium, magnesium, silicon, aluminum, titanium, yttrium, or zinc, and may include any of these materials at any oxidation state. For example, exemplary ceramic materials may include oxides or nitrides of any of the noted elements, and may include aluminum nitride, aluminum oxide, including alpha, beta, and gamma classes of aluminum, boron nitride, including hexagonal crystalline form, magnesium hydroxide, magnesium oxide, silicon nitride, silicon aluminum oxynitride or Sialon, as well as any other ceramic materials or combination.

By producing separators according to embodiments of the present technology, reduced thickness separators may be produced compared to conventional ceramic separators. For example, while conventional standalone ceramic separators may be limited to thicknesses greater than or about 20 μm, the present technology may produce separators, including one or both of separator layers 210 and 260, and/or an additional 15 layer between the first layer 210 and electrode active layer 205, that are less than or about 30 μm in thickness, and may be characterized by a thickness of less than or about 25 μm, less than or about 20 μm, less than or about 18 μm, less than or about 16 μm, less than or about 15 μm, less than or about 14 μm, less than or about 13 μm, less than or about 12 μm, less than or about 11 μm, less than or about 10 μm, less than or about 9 μm, less than or about 8 μm, less than or about 7 μm, less than or about 6 μm, less than or about 5 μm, less than or about 4 μm, less than or about 3 μm, less than or about 2 μm, less than or about 1 μm, or less in embodiments. Additionally, by forming the separator layers directly over electrode materials or current collectors as described further below, separators according to embodiments of the present technology may be wound into rolls of materials that may be later processed into particular cell form factors and configurations. When ceramic separators are formed over a liner, such as with conventional devices, the thickness is often limited to a minimum above a few dozen micrometers to allow adequate handling of the produced separator. Once the liner or carrier film is removed, the separator is then placed in a cell. The present technology is not limited in this respect, because the ceramic layer may be formed directly over the electrode active material, or a polymeric film, which may also provide the benefit of allowing the composite product to be wound during fabrication.

Exemplary first separator layer 210 may also include one or more additional components, such as porogen 240 or microencapsulated material 250. Porogen 240 may be included within the layer to allow additional porosity to be produced during fabrication. For example, porogen 240 may include a low-molecular-weight polymer or monomer that may evaporate when exposed to an energy source, such as ultraviolet light, an e-beam, or a heat source. By adjusting the wavelength or intensity of the energy source, more or less porogen may be dissolved, which may adjust the porosity and tortuosity through the separator layer. Accordingly, porosity and air permeability may be maintained to facilitate ionic transportation through exemplary battery cell separators of the present technology. In some embodiments, a porogen may not be incorporated. For example, depending on the ceramic material utilized, such as gamma alumina as one non-limiting example, the porosity through the separator layer may be sufficient, and additional porosity through porogen dissolution may not be performed, although in some embodiments incorporation of porogen or a lesser inclusion may be performed.

Exemplary separators according to the present technology may be characterized by a porosity greater than or about 15%, and may be characterized by a porosity greater than or about 20%, greater than or about 30%, greater than or about 40%, greater than or about 50%, greater than or about 60%, greater than or about 70%, greater than or about 80%, or more, although porosity may be maintained below or about 85%, below or about 80%, below or about 75%, below or about 70%, below or about 65%, or below or about 60% or less, to provide adequate control over transfer across the separator. Porosity may also be maintained within any range encompassed by any of these ranges or between any two noted or encompassed percentages.

As noted previously, air permeability may be related to porosity and pore tortuosity across a thickness of the separator, which may affect ionic transfer across the separator during operation in a battery cell. Air permeability may be measured as the time in seconds to pass 100 cubic centimeters of air across the separator. Separators according to the present technology may be characterized by air permeability across the separator of less than or about 400 s/100 cc. In some embodiments, the separator may be characterized by air permeability of less than or about 350 s/100 cc, less than or about 300 s/100 cc, less than or about 250 s/100 cc, less than or about 200 s/100 cc, less than or about 150 s/100 cc, less than or about 100 s/100 cc, less than or about 50 s/100 cc, or less. Any of the air permeability numbers may relate to any number of separator components or layers as well as any thickness of the separator or individual layers.

First separator layer 210 also includes a microencapsulated material 250 in some embodiments. Dispersed throughout the first separator layer 210, microencapsulated material 250 may provide an additional feature to cause shutdown of ionic transfer during abuse events. Because ceramic materials may be characterized by high thermal stability, the separator may maintain functionality during these events. Microencapsulated material 250 may operate to fill pores of the first separator layer 210, which may reduce, limit, or halt ionic transfer across the separator. For example, microencapsulated material 250 may include a first material 252 contained within a second material 254. The second material 254 may form a shell about the first material 252, which may be a flowable material. The second material 254 may be characterized by a breakdown temperature, which may be a melting temperature in some embodiments, although the breakdown temperature may also be a temperature at which the first material 252 may be expressed from the second material 254.

The breakdown temperature may be based on a cell operation temperature in some embodiments. For example, for cell designs configured to operate at temperatures below 100° C., the breakdown temperature may be greater than 100° C. The breakdown temperature may also be a relative temperature to the cell operating temperature, such as a temperature at least about 10° C. above the cell operating temperature, at least about 20° C. above the cell operating temperature, at least about 30° C. above the cell operating temperature, at least about 40° C. above the cell operating temperature, at least about 50° C. above the cell operating temperature, or higher. Once the first material 252 is released from the second material 254, the first material may flow within the first separator layer 210 to fill pores within the structure, and block ionic movement across the separator.

Second separator layer 260, may be included along the first separator layer 210 opposite the electrode material 205. Binders and ceramics utilized in separators according to the present technology may provide reduced adhesion to electrode active materials utilized in the cell. During cell cycling, as the active materials may swell, interfacial issues may extend without adequate adhesion between the separator and the electrode. This may allow further swelling, which may affect capacity or other capabilities of the battery cell.

By incorporating an additional adhesive material, which may be second separator layer 260 or material included within the layer, the present technology may overcome issues related to binders characterized by improved thermal stability.

Exemplary adhesives may include a variety of adhesive materials that may couple or bond with both the first separator layer 210 of the separator as well as an adjacent electrode active material. Suitable adhesives may include multiple adhesive materials including polymeric materials. Exemplary polymeric materials may be materials including acetate, acrylate, vinyl groups, styrene, or any other materials that may be utilized according to the present technology. For example, exemplary adhesives may include acrylate and/or polyvinylidene fluoride ("PVDF"), including poly(vinylidene fluoride-co-hexafluoropropylene), the morphology of which may be controlled to limit reductions in porosity. For example, the adhesives may be provided in ovular or spherical as well as other shaped segments, which allow additional spacing between adhesive particles. In some embodiments the second separator layer 260 may also be applied discontinuously across the surface of the first separator layer 210.

Exemplary adhesive particles may be characterized by a diameter of less than or about one micrometer in embodiments, and may be characterized by a diameter of less than or about 900 nm, less than or about 800 nm, less than or about 700 nm, less than or about 600 nm, less than or about 500 nm, less than or about 400 nm, less than or about 300 nm, less than or about 200 nm, less than or about 100 nm, or less. Additionally, the adhesive may be applied so as to further limit the effect on porosity or air permeability. For example, the second separator layer 260 may be staggered, or patch coated, along a surface of the first separator layer 210. In non-limiting embodiments, the second separator layer may be particles, lines, or other shapes of adhesive particles formed across the surface of the first separator layer.

When an additional adhesive is applied along a surface of the separator, the adhesive may block or otherwise affect the pores through the separator. This may affect air permeability, which may be related to rate capability of a battery cell in which the separator may be disposed. By utilizing any of a number of forms of discontinuous coating, the adhesive may be incorporated to reduce an impact on porosity and permeability, while providing sufficient adhesion to an electrode active material. Additionally, when the adhesive particles include a rounded, ovular, or spherical shape, gaps may be maintained about particles included in the adhesive layer. This may allow separators according to embodiments of the present technology to maintain any of the porosity or air permeability characteristics described previously.

Discontinuous coatings may be formed in any number of ways as noted above, such as with various coating techniques. Additionally, loading of the adhesive, or the amount of adhesive deposited, may be adjusted to create more of a patched distribution of adhesive, which may produce a non-uniform coating affording increased porosity and permeability. For example, lower loading of adhesive may be applied, such as in a sputtered application, to limit uniformity. The loading may be less than or about 10 $g/m^2$, and in some embodiments the loading may be less than or about 9 $g/m^2$, less than or about 8 $g/m^2$, less than or about 7 $g/m^2$, less than or about 6 $g/m^2$, less than or about 5 $g/m^2$, less than or about 4 $g/m^2$, less than or about 3 $g/m^2$, less than or about 2 $g/m^2$, less than or about 1 $g/m^2$, less than or about 0.9 $g/m^2$, less than or about 0.8 $g/m^2$, less than or about 0.7 $g/m^2$, less than or about 0.6 $g/m^2$, less than or about 0.5 $g/m^2$, less than or about 0.4 $g/m^2$, less than or about 0.3 $g/m^2$, less than or about 0.2 $g/m^2$, less than or about 0.1 $g/m^2$, or less.

Figure 3:
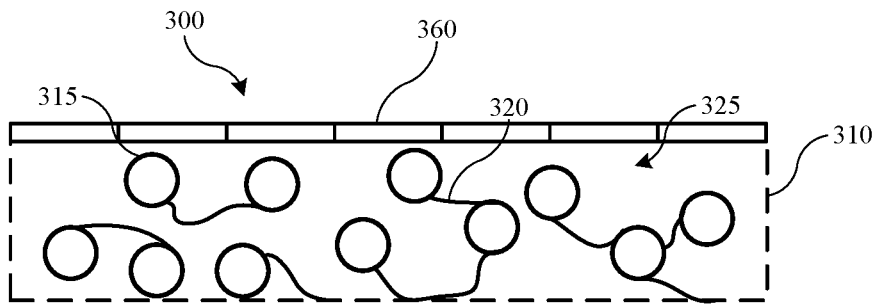
FIG. 3 shows a schematic view of an exemplary separator according to some embodiments of the present technology.

FIG. 3 illustrates a ceramic material layer 300 that may be formed as a standalone film, or may be formed over a polymeric film, and which may be used in separators according to some embodiments of the present technology, as well as additional applications for which thin ceramic films may be useful. Ceramic material layer 300 may include any or all of the aspects, materials, or characteristics of separator 200 in some embodiments, and may be utilized in battery cells, such as cell 100 discussed above. For example, ceramic material layer 300 may include a combination material layer 310 that may incorporate one or more ceramic particles 315, and binders 320 within unspecified spacing 325. In some embodiments ceramic material layer 300 may also include an adhesive material 360 similar to adhesive material 260 described above. These embodiments may include when the ceramic material layer 300 is used as or in a separator, such as for a battery, or other material for which additional adhesion capabilities may be included, although adhesive material 360 may not be used in embodiments including in some battery separator designs.

In some embodiments ceramic material layer 300 may include particular materials configured to provide selected characteristics to the layer. For example, ceramic particles 315 may differ from, or be a subset of, ceramic particles 215, and may be specifically ceramic particles that alone or in combination produce or are characterized by a particular surface area. For example, different ceramic materials may be characterized by a range of surface areas, including within individual material oxides. As one non-limiting example, aluminum oxide may include various crystalline structure phases including alpha, gamma, chi, kappa, theta, eta, and delta, for example. These phases may not be characterized by similar surface areas, however, and may affect the operation and manufacturing of ceramic material layer 300. For example, while particles of alpha aluminum oxide may be characterized by a surface area of approximately 8 $m^2/g$, particles of gamma aluminum oxide may be characterized by a surface area of over 100 $m^2/g$. Other materials and ceramics as described previously may be characterized by similar properties. Accordingly, in some embodiments, the ceramic materials used in ceramic material layer 300 may be characterized by a surface area, either individually or in combination, of greater than or about 10 $m^2/g$, greater than or about 20 $m^2/g$, greater than or about 30 $m^2/g$, greater than or about 40 $m^2/g$, greater than or about 50 $m^2/g$, greater than or about 60 $m^2/g$, greater than or about 70 $m^2/g$, greater than or about 80 $m^2/g$, greater than or about 90 $m^2/g$, greater than or about 100 $m^2/g$, or greater.

Ceramic materials utilized in the present technology may also afford additional benefits for the ceramic material layer 300, including scavenging capabilities in some embodiments. For example, in lithium-ion battery cells, certain chemical reactions may occur between electrolytic components and components included in the anode or cathode active materials. These reactions may produce gaseous materials such as hydrogen fluoride. Production of hydrogen fluoride or other gaseous components may cause the battery cell to swell. Without binding the present technology to any particular theory of operation, some ceramic materials may operate to adsorb hydrogen fluoride to the surface of the ceramic, which may reduce or limit swelling of the battery cell. As surface area increases, the adsorption capabilities may increase as well. Returning to the non-limiting example of alpha and gamma alumina, alpha phase alumina, characterized by a lower surface area, may be capable of adsorbing less than 2 mg HF/g of ceramic. However, gamma phase alumina, characterized by a higher surface area, may be capable of adsorbing greater than 7 mg HF/g of ceramic. Other materials and ceramics as described previously may be characterized by similar properties. Accordingly, in some embodiments, the ceramic materials used in ceramic material layer 300 may be characterized by a scavenging capability with respect to HF or other fluids, either alone or in combination, of greater than or about 2 mg/g of the ceramic material, and may be characterized by a scavenging capability of greater than or about 3 mg/g, greater than or about 4 mg/g, greater than or about 5 mg/g, greater than or about 6 mg/g, greater than or about 7 mg/g, greater than or about 8 mg/g, greater than or about 9 mg/g, or more.

Any of the materials discussed previously may be used alone or in combination to tune either surface area or scavenging of the ceramic material used in layer 300. In some embodiments the materials may include one or more of aluminum oxide, magnesium oxide, zinc oxide, zirconium oxide, silicon oxide, titanium oxide, copper oxide, tin oxide, or chromium oxide, and may utilize one or more of these materials in any phase or form.

Figure 4:
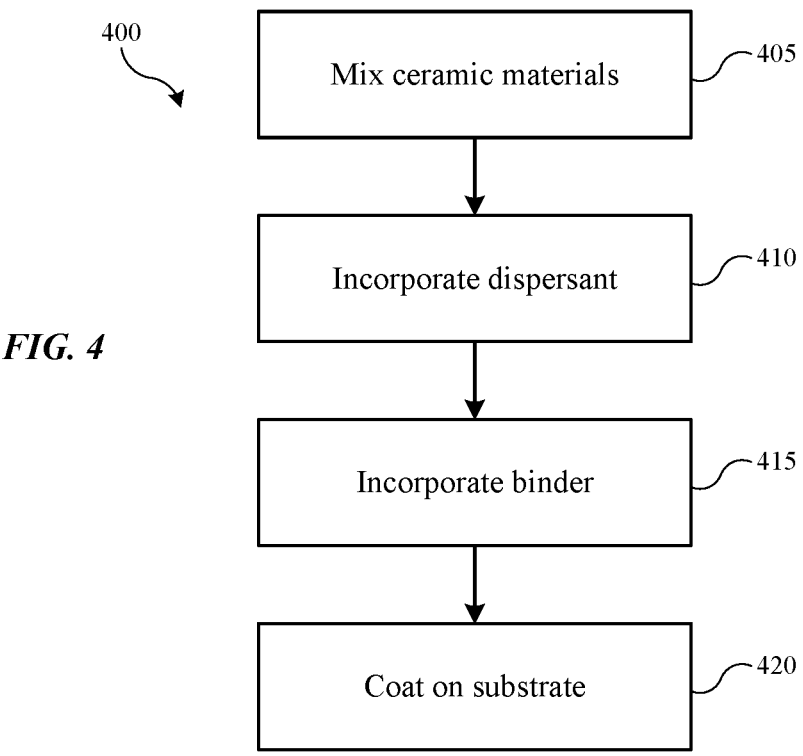
FIG. 4 shows exemplary operations of a method of forming a ceramic material according to some embodiments of the present technology.

As discussed previously, utilizing ceramic materials characterized by increased surface area ceramic materials may cause manufacturing difficulties. However, the present technology may utilize improved manufacturing techniques allowing the formation of reduced thickness ceramic material layers. FIG. 4 identifies selected operations in a method 400 of forming a ceramic material. The method may be used in forming ceramic material layers, which may be used in any of the separator or thin film materials noted previously, as well as in additional or alternative ceramic formation.

Method 400 may begin by admixing ceramic material with one or more fluids to produce a first mixture at operation 405. The ceramic materials may include any of the previously noted materials, and may be characterized by any of the properties described above. The first mixture may be an aqueous mixture, and may include water, such as deionized water, and a dispersant, which will be described in further detail below. To the first mixture may be provided an additional dispersant or material to produce a second mixture at operation 410. The second dispersant may be a polymeric dispersant, which may reduce phase separation between the ceramic particles and the aqueous materials. For example, the polymeric dispersant may be an organic polymeric dispersant, such as a cellulose derivative, for example, and may include a long-chain polymeric material to facilitate incorporation of the ceramic materials. In one example, the polymeric dispersant may be carboxymethyl cellulose. The carboxymethyl cellulose may be incorporated as an aqueous solution, such as less than or about 10% carboxymethyl cellulose in water, and may be a solution of less than or about 8% carboxymethyl cellulose, less than or about 6% carboxymethyl cellulose, less than or about 4% carboxymethyl cellulose, or less.

At operation 415 a binder may be incorporated with the second mixture to form a slurry. The binder may be any of the previously described binder materials, and may be included at any of the previously noted percentages. With the binder, an additional agent may be included to facilitate wetting of the ceramic material to a substrate. Any compatible wetting agent may be utilized in method 400, and in some embodiments an alcohol may be utilized including denatured alcohol or isopropyl alcohol, for example. Mixing may be performed at any or between any of the operations noted above, and may include multi-step mixing including lower and higher speed mixing, including de-foaming final mixing, or any other mixing techniques. Once formed, the slurry may be coated or deposited on a substrate at operation 420. The substrate may be a carrier film, a polymer film for a separator, an electrode including an electrode active material, or any other material on to which a ceramic material layer may be applied. The application may include a variety of coating techniques including slot-die coating, or other deposition processes described further below.

Deposition of the produced ceramic material may increase in difficulty with increased surface area characteristics of the ceramic material used. As surface area increases, particle aggregation may increase, which may increase viscosity and reduce uniformity of the material, and may limit coating to increased thicknesses. The dispersant utilized to form the first mixture may affect the viscosity of the produced slurry, and thus the dispersant may be selected to reduce overall slurry viscosity. Standard dispersants may be used in some embodiments in which the surface area characteristics of the ceramic materials may be lower, however when surface area characteristics of the ceramic materials increase to surface areas greater than or about 50 $m^2/g$, standard dispersants may be incapable of effectively reducing slurry viscosity. Accordingly, in some embodiments an ionic dispersant may be utilized as the water-soluble dispersant.

Ionic dispersants utilized in the present technology may include any known ionic dispersants, and may be characterized by a variety of cationic and anionic elements or moieties. The dispersants may include anionic, cationic, and amphoteric materials. The dispersants may include a polymer backbone in some embodiments, and the backbone may be either cationic or anionic. Dispersants including an anionic backbone may include an additional cationic component, and dispersants including a cationic backbone may include an additional anionic component. For example, some dispersant cationic species may include sodium or ammonium, as non-limiting examples, and anionic moieties may include acrylate, polyacrylates, carboxylic acids, phosphates, sulfates, sulfonates, polyionic salts, among other anionic species. Ionic dispersants useful in the present technology may further be ionic dispersants characterized by a polymeric chain having the cationic component located within a repeating moiety of the polymeric chain of the dispersant. For example, and without being bound to any particular theory, because of the high or very high surface area characteristics of some ceramic materials that may be used, such as gamma alumina, longer polymer chain ionic dispersants characterized by the cationic positioning noted above may provide increased charge transfer capabilities to the ceramic materials. This may increase repellant forces of the ceramic materials, which may increase dispersion of the particles, reduce aggregation, and increase uniformity of the produced slurry.

Thus, in some embodiments longer-chain ionic dispersants such as ammonium polymethacrylate, and sodium polyacrylate or polymethacrylate, for example, may be utilized due to the increased number of ions available, as the cationic component may be located within the repeating moiety of the compound. Similarly, in some embodiments these noted ionic dispersants may be utilized over dispersants such as sulfates or sulfonates, where the repeating unit may be, for example, an alkyl moiety that may not impact the available ions from the molecule, which may be limited to one or a specified number of available ions per molecule.

By utilizing ionic dispersants characterized by the above-noted properties, slurries produced in method 400 may be characterized by viscosities of less than or about 200 cp in some embodiments. For example, when non-ionic dispersants were utilized to produce slurries, the slurry was characterized by viscosities greater than 1400 cp, which may limit the coating to increased thicknesses, such as several dozen micrometers or more. When ionic dispersants characterized by the above-listed properties were used, the slurry viscosity was below 100 cp. Accordingly, depending on the amounts and components utilized in embodiments of method 400, the formed slurry may be characterized by a viscosity of less than or about 500 cp, and may be characterized by a viscosity of less than or about 400 cp, less than or about 300 cp, less than or about 200 cp, or less than or about 100 cp, including any smaller range included in any of these stated ranges.

The viscosity reduction may allow an increased incorporation of ceramic materials, such as greater than 50% incorporation by weight, and greater than 85% incorporation by weight in some embodiments, while additionally allowing coating at limited thickness. For example, in some embodiments slurries were produced with greater than 85% incorporation of ceramic material by weight, with the ceramic materials characterized by a surface area greater than 100 $m^2/g$, and with a viscosity of less than 100 cp. This combination of properties allowed the formation of ceramic material layers on a substrate characterized by a thickness of less than or about 20 μm, and in some embodiments characterized by a thickness of less than or about 15 μm, less than or about 10 μm, less than or about 8 μm, less than or about 5 μm, less than or about 4 μm, less than or about 3 μm, less than or about 2 μm, or less, as well as between about 1 μm and about 4 μm in some embodiments. In some embodiments, subsequent formation of the ceramic material layer, an adhesive layer may be formed overlying the ceramic material layer as previously described. The produced materials may be used in a variety of devices, which may include as separators in stacked batteries described below.

Figure 5:
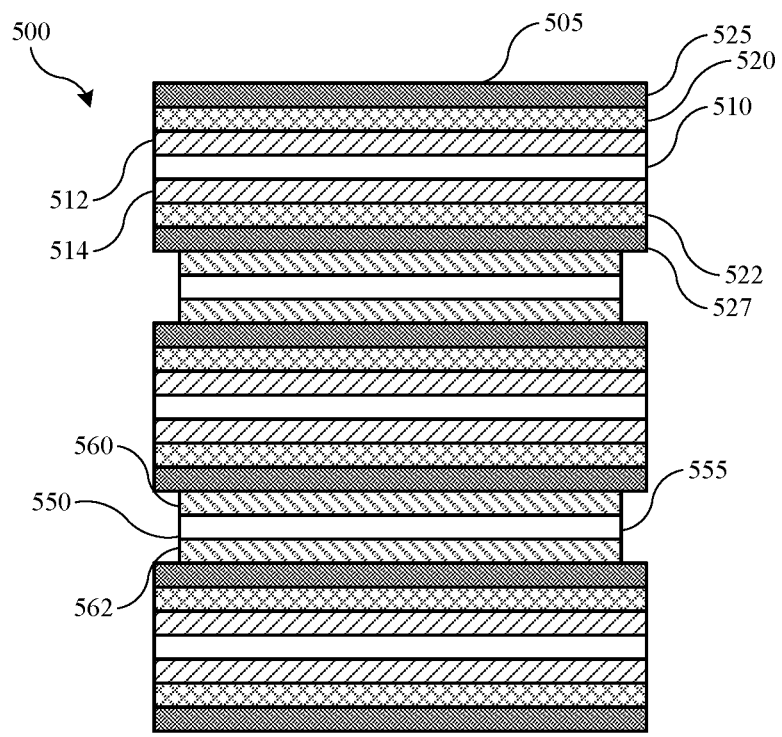
FIG. 5 shows a schematic cross-sectional view of a stacked battery according to some embodiments of the present technology.

FIG. 5 illustrates a schematic cross-sectional view of a stacked battery 500 according to some embodiments of the present technology. Stacked battery 500 may include multiple electrodes including anode electrodes 505 and cathode electrodes 550 according to embodiments of the present technology, and may include one or more of the components or materials discussed previously. As illustrated, separators may be formed along the anode active materials, although this is not intended to be limiting. For example, in many battery cell designs in which a graphite material is utilized within the anode, the anode may be characterized by a larger size than the corresponding lithium-containing cathode material in order to match the operating functionality of the electrodes. Accordingly, because the anode may be larger than the cathode in some embodiments, the separator may be formed along the anode to provide complete coverage between the active materials of the two electrodes. It is to be understood that in other embodiments the separator layers may be formed over the cathode active material.

As illustrated, anode electrodes 505 may include an anode current collector 510, which may be copper or any of the previously noted materials. On opposing surfaces, an anode active material 512, 514 may be formed. It is to be understood that other cell designs are similarly encompassed by the present technology, such as wound battery cells, in which the active material, as well as the separator materials, may be formed on both current collector surfaces or on only one surface of the current collector. A first separator layer 520, 522 may be formed across each of the respective anode active material layers 512, 514 as will be described below. A second separator layer 525, 527 may optionally be formed over each of the respective first separator layers 520, 522. It is to be understood that any of the separator designs previously described may be incorporated, and may include any aspect of FIG. 2 and/or FIG. 3 as described above.

Cathode electrodes 550 may include a cathode current collector 555, which may be aluminum or any other material that may operate as a cathode current collector. On opposing surfaces of the cathode current collector 555 may be cathode active material 560, 562. The anode electrodes 505 and the cathode electrodes 550 may then be stacked in alternating layers as illustrated to produce a stacked battery 500. The second separator layers 525, 527 may couple the anode electrodes 505 with the cathode electrodes 550. In this way, the first separator layers 520, 522 may be positioned adjacent or in contact with the anode active materials, 512, 514, while the second separator layers 525, 527 may be positioned adjacent or in contact with the cathode active materials 560, 562. When the separators are formed on the cathode electrodes, it is to be understood that the individual separator layers may be in contact with the alternate active materials.

Figure 6:
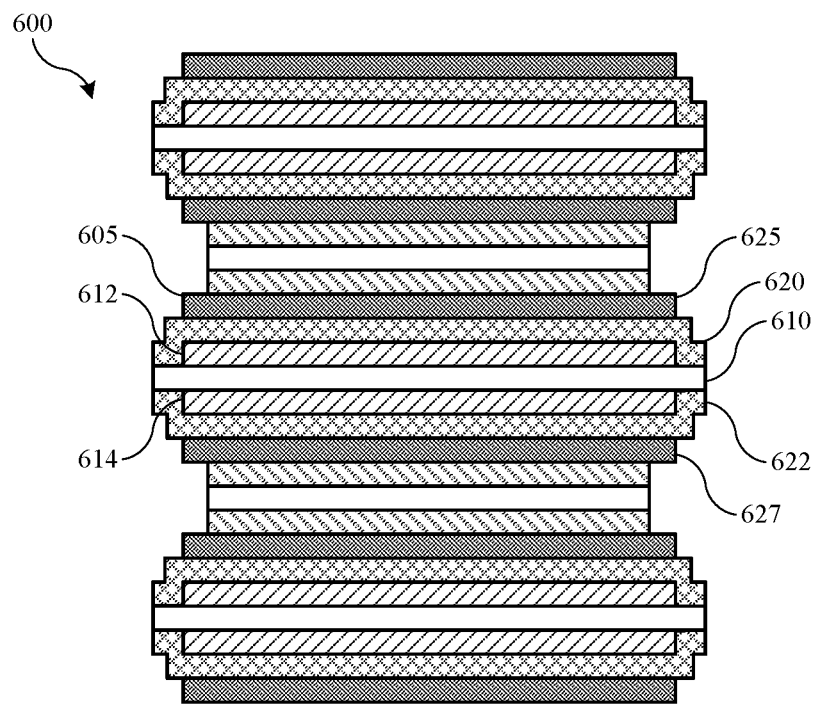
FIG. 6 shows a schematic cross-sectional view of a stacked battery according to some embodiments of the present technology.

FIG. 6 shows a schematic cross-sectional view of a stacked battery 600 according to some embodiments of the present technology. Stacked battery 600 may include a battery similar to stacked battery 500, and may include similar materials as noted above. Stacked battery 600 may illustrate an alternative arrangement of separator materials, which may extend beyond the lateral dimensions of the electrode active materials, and may at least partially contact one or more of the current collectors. Again, stacked battery 600 illustrates the separators formed over the anode electrodes 605, although it is to be understood that the separators may be formed over the cathode electrodes in other embodiments. As illustrated, first separator layers 620, 622 may extend beyond one or both lateral edges of anode active material 612, 614. The first separator layers 620, 622 may contact current collector 610 on both opposing surfaces of the current collector. Such a configuration may further limit the possibility of contact between the active materials or current collectors that may cause shorting within the battery for either stacked or wound cell designs.

FIG. 6 illustrates only the first separator layers 620, 622 extending beyond the lateral edges of the anode active materials 612, 614 and contacting current collector 610. It is to be understood that in alternative configurations second separator layers 625, 627, or both separator layers, may extend beyond the lateral edges of the anode active materials. However, as noted previously, in some embodiments the second separator layers 625, 627 may not be complete coatings, and may be discontinuous across the surface of the electrode. Accordingly, such a discontinuous coating may not provide the encapsulation of first separator layers 620, 622, which may be complete across the surface of the anode active materials 612, 614.

Figure 7:
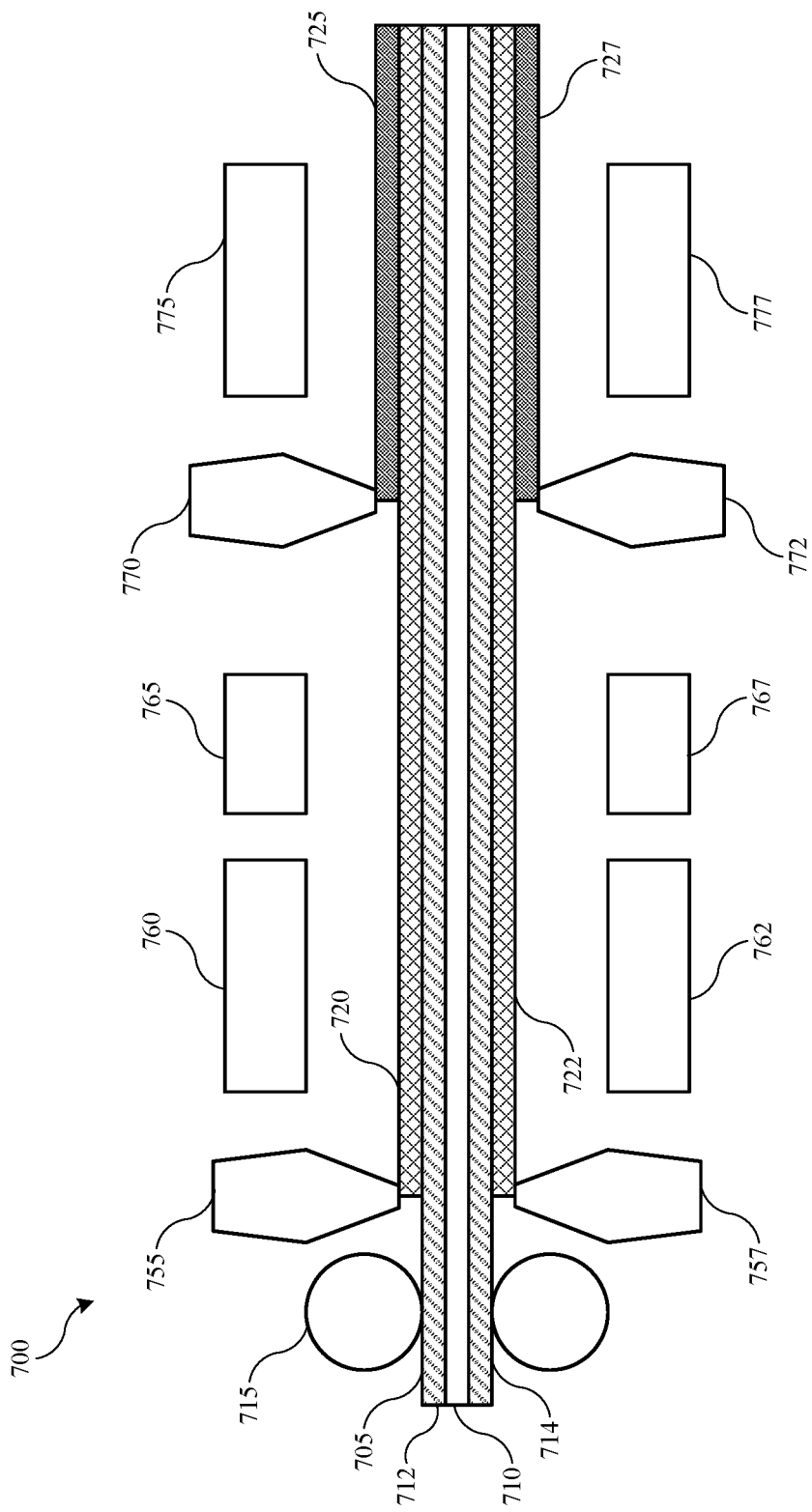
FIG. 7 shows a schematic view of a fabrication process for producing separators according to some embodiments of the present technology.

FIG. 7 shows a schematic view of a fabrication process 700 for producing separators according to some embodiments of the present technology. The fabrication process 700 may be performed as a roll-to-roll process, and may be performed to produce windings of battery cell components that may be further processed in later fabrication operations. Fabrication process 700 may be a mid-line process performed on a substrate of pre-formed materials, such as electrode active materials previously disposed on a current collector, as well as over a polymeric film that may constitute part of a battery separator, for example, and also over a carrier film as previously described. The substrate may be provided directly from a previous operation, such as deposition of electrode active materials on a current collector, or a roll of polymeric material or electrode active material on a current collector may be unspooled into fabrication process 700. Similarly, subsequent processing, the substrate on which a separator is formed may be wound into a spool for later processing, or may be delivered to additional equipment to be further processed. In some embodiments, the material formed by fabrication process 700 may be directly used in wound cell applications, or diced for stacked cell configurations.

As noted, fabrication process 700 may deliver a substrate 705 to a set of rollers 715, or some other apparatus for moving the substrate through the fabrication process 700. Substrate 705 may include a current collector 710 on which an electrode active material may be disposed. The electrode active material may be disposed on one or two opposing surfaces of the current collector. As illustrated, electrode active materials 712, 714 are formed over current collector 710, and delivered into the fabrication process. As discussed previously, the electrode active materials 712, 714 may be either anode active materials or cathode active materials in different embodiments. Fabrication process 700 may include depositing a first separator layer 720 over the electrode active material 712, as well as first separator layer 722 on electrode active material 714 when formed on opposite sides of the substrate 705. The first separator layer 720 may be or include any of the materials discussed previously for first separator layers, and in some embodiments first separator layers 720, 722 include a ceramic material. The first separator layers may be applied or deposited in any number of ways including by gravure coating, slot die coating, doctor blade coating, or other coating techniques that may provide a complete and uniform coverage across the electrode active materials 712, 714. Representative applicators 755, 757 are illustrated to represent any of these potential deposition techniques.

Fabrication process 700 may also include depositing a second separator layer 725 over the first separator layer 720, as well as a second separator layer 727 on first separator layer 722 when formed on opposite sides of the substrate 705. Second separator layers 725, 727 may be or include any of the materials discussed previously for the second separator layers, and in some embodiments second separator layers 725, 727 are or include an adhesive material. As previously noted, second separator layers 725, 727 may be continuous coatings or may be discontinuous in some embodiments. The second separator layers may be applied or deposited in any number of ways including by gravure coating, slot die coating, doctor blade coating, spray coating, or other coating techniques that may provide a complete and uniform coverage or discontinuous coverage across the first separator layers 720, 722. Representative applicators 770, 772 are illustrated to represent any of these potential deposition techniques. Subsequent deposition of the second separator layers, the substrate 705 may be passed through or across driers 775, 777 to dry the second separator layer to form a battery cell component, which may include an electrode and separator structure in some embodiments.

In some embodiments, the porosity of the formed separator may be sufficient for operation, and thus the fabrication process 700 may be a wet-on-wet process. The first separator layers may include one or more solvents that may be maintained while the second separator layers 725, 727 are formed overlying the first separator layers 720, 722. The operation of drying the second separator layers may include drying the first separator layers as well to remove the remaining solvents.

In other embodiments, the first separator layers 720, 722 may include a porogen as previously described, that may be exposed to an energy source to dissolve some of the porogen and increase the porosity of the formed separator layer. When a porogen is included in the first separator layers 720, 722 deposited on the electrode active materials, the fabrication process may include additional operations. As illustrated, first separator layers 720, 722 may be dried under dryers 760, 762 subsequent the deposition, and prior to formation of second separator layers 725, 727. By drying the first separator layers 720, 722, the ceramic materials may be set, and may limit further flowing of the layers subsequent the exposure, which may otherwise close pores formed by dissolving the porogen. The drying process may be controlled by temperature, path length, and time across driers 760, 762, which may include multiple sets of driers in some embodiments. However, because first separator layers 720, 722 may be less than 20 μm in thickness in some embodiments, the drying process may be performed with relative ease along the fabrication process.

After the first separator layers 720, 722 have been dried, the layers may be exposed to an energy source to dissolve at least a portion of the porogen contained within the first separator layers. The energy source may be any source that may dissolve some or all of the porogen within the first separator layers without damaging the ceramic material or binder. In some embodiments ultraviolet exposure, e-beam exposure, or heat exposure may be performed to dissolve at least a portion of the porogen to produce the porous structure. Exemplary energy sources 765, 767 may provide the energy to dissolve at least a portion of the porogen in embodiments. Phase inversion is an additional technique by which porosity may be formed within a material layer. However, because the first separator layer is formed directly overlying electrode active materials of the battery cell components, phase inversion may not be applicable to fabrication process 700 in some embodiments. In embodiments where the separator may be formed in a standalone or separate non-roller process, phase inversion may be utilized with any of the materials previously described to form a first separator layer that may be characterized by some or all of the properties previously described.

Figure 8:
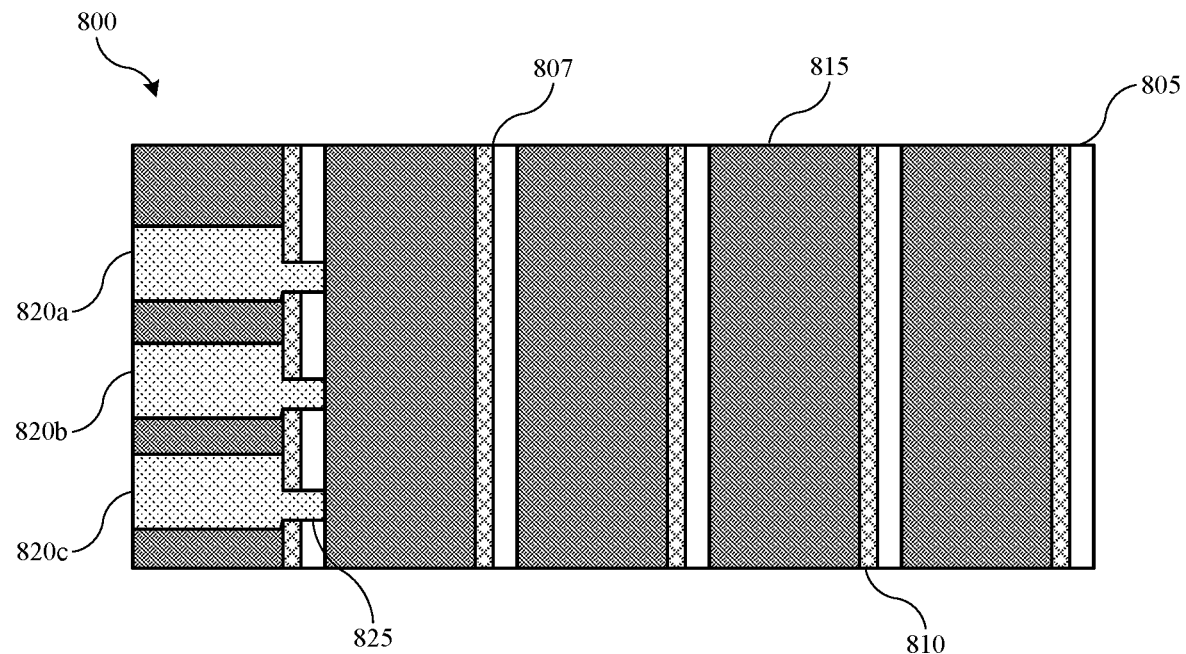
FIG. 8 shows a schematic plan view of a produced battery cell component sheet according to some embodiments of the present technology.

Turning to FIG. 8 is shown a schematic plan view of a produced battery cell component sheet 800 according to some embodiments of the present technology. Sheet 800 may be substrate 805 subsequent performance of fabrication process 700 to form a separator material over electrode active materials. Fabrication process 700 was described as a continuous process being performed along a moving substrate. Sheet 800 illustrates how fabrication process 700 may be performed by discontinuous application of the first separator materials and the second separator materials to allow formation of electrode tab portions of the formed battery components. In embodiments the sheet 800 may be used in stacked cell formation where layers of material may be disposed vertically. This material may be used from materials formed in fabrication process 700 or from additional formation techniques.

In many battery cells, the electrode current collectors include a tab portion allowing for delivery or receipt of current to or from the battery cell during operation. The tab portion of current collectors is often formed or cut from the current collector after deposition of the electrode active materials. This cutting process may produce burrs on the current collector, which may be a metal material. These burrs may puncture separators disposed over the current collector and active material, which may cause shorting between layers of a formed battery cell. The present technology may reduce the formation or effect of cut burrs by forming the separator layer over the current collector prior to dicing of the electrodes.

As illustrated in FIG. 8, a current collector 805 may be provided during a fabrication operation. Although hidden under illustrated separator layers, electrode active materials may be applied discontinuously along the current collector 805 in some embodiments of the present technology. The electrode active materials may be applied to maintain lateral gaps 807 across the current collector, and along the substrate between electrode segments. The current collector 805 may remain exposed within lateral gaps 807. A first separator material 810 and a second separator material 815 may then be formed overlying the electrode active materials by any of the techniques previously described. Similar to the electrode active material, the first separator material 810 and the second separator material 815 may be discontinuously applied over the substrate. At least one of the first separator material and the second separator material, such as first separator material 810 as illustrated, may be deposited to extend partially within the lateral gaps 807 laterally across the current collector 805. The application may not fully extend across the lateral gaps 807, which may maintain a portion of the underlying current collector 805 exposed within the lateral gaps 807. This portion of the exposed current collector 805, may form the electrode tab.

Subsequent formation of the layers of electrode and separator materials, a dicing operation may be performed to divide the substrate into a number of battery cell components, such as electrodes including separator materials. The dicing may be performed to produce a number of electrode shaped components 820, such as components 820a, 820b, 820c as illustrated. The battery cell electrodes as diced may include an electrode tab 825 that includes a section of the current collector 805 exposed within the lateral gaps 807 across the current collector substrate. The tab 825 is also partially coated with at least one of the first separator layer 810 or the second separator layer 815. Although three such battery components 820 are illustrated, it is to be understood that any number of components may be formed depending on the lateral dimensions of the substrate, the size of the components being diced, and the amount of waste material produced, which may be based on the efficiency and precision of the dicing.

Figure 9:
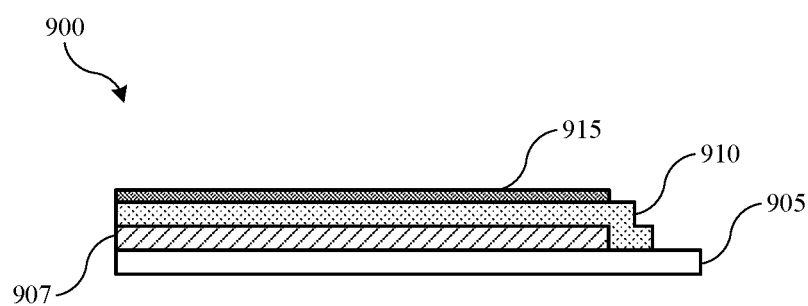
FIG. 9 shows a schematic cross-sectional view of a produced battery cell component according to some embodiments of the present technology.

FIG. 9 shows a schematic cross-sectional view of a produced battery cell component 900 according to some embodiments of the present technology. Subsequent the dicing discussed above, an individual component 900 may be formed that includes a first separator material 910 and a second separator material 915 formed over a current collector 905. As illustrated, first separator material 910 may extend into the tab portion of the current collector 905, and may extend over an electrode active material 907. Accordingly, when the dicing is performed, the portion of the first separator layer 910 extending onto the current collector 905 may protect against burrs which may otherwise be formed. Because the first separator layer 910 may be present prior to dicing, any burrs produced may be contained within the first separator layer, which may encapsulate the burr at the time it is formed.

Forming the separator materials over the electrode active materials and current collectors may provide additional advantages over conventional designs. For example, in battery designs having shapes that are not rectangular, such as L-shaped or T-shaped cells, for example, conventional formation may produce adhesion issues with the separator materials. For example, in many conventional fabrication techniques, the current collector is cut, followed by application of the separator, which is subsequently cut to size. The process may then include the application of heat or pressure to the materials to allow adhesion between the separator and the electrode active materials to occur. However, this process may cause increased stress at the corners where the cutting was performed compared to central areas, which may cause delamination of the separator along corners or edges. Similarly z-folding processes and bi-cell stacking can produce similar issues of inconsistent stress along the interface of the separator. Direct coating processes such as described overcome these issues by forming and laminating the separator prior to dicing, which may afford improved adhesion and reduced delamination at edge regions.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s) ", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A method comprising:
   admixing a ceramic material with a water-soluble dispersant to form a first mixture;
   admixing an organic polymeric dispersant with the first mixture to form a second mixture;

admixing a binder with the second mixture to form a slurry;

depositing the slurry on a substrate; and depositing an adhesive material on the slurry at a loading of less than or about 5 g/m$^2$, wherein the adhesive material comprises an acrylate or polyvinylidene fluoride.

2. The method of claim 1, wherein the water-soluble dispersant is an ionic dispersant.

3. The method of claim 2, wherein the ionic dispersant is characterized by a polymeric chain having a cationic component within a repeated moiety of the polymeric chain.

4. The method of claim 2, wherein the ionic dispersant comprises an anionic backbone.

5. The method claim 1, wherein the organic polymeric dispersant comprises carboxymethyl cellulose.

6. The method of claim 1, wherein admixing the binder further comprises incorporating isopropyl alcohol within the second mixture.

7. The method of claim 1, wherein the slurry is characterized by a viscosity below about 200 cp.

8. The method of claim 1, wherein the substrate comprises a carrier film, an electrode, or a polymer layer.

9. The method of claim 1, wherein the slurry is deposited on the substrate to a thickness of less than or about 10 μm.

10. The method of claim 1, wherein the ceramic material comprises gamma alumina.

11. The method of claim 1, further comprising adding an additional agent to the binder to facilitate wetting of the substrate.

12. The method of claim 11, further comprising adding an alcohol to the substrate.

13. The method of claim 1, wherein the substrate comprises a carrier film.

14. The method of claim 1, wherein depositing the slurry on the substrate comprises slot-die coating.

15. The method of claim 1, wherein a viscosity of the slurry is less than or about 200 cp.

16. The method of claim 1, further comprising depositing the adhesive material on a surface of the ceramic material.

17. The method of claim 1, further comprising utilizing the ceramic material as a separator in a stacked battery.

18. The method of claim 1, further comprising applying the slurry to a polymeric material to form a two-layer separator.

19. The method of claim 1, wherein the ceramic material comprises greater than 50% of the slurry by weight.

20. The method of claim 1, wherein the ceramic material comprises a surface area greater than 50 m$^2$ per gram.

* * * * *